United States Patent
Yoshimura et al.

(10) Patent No.: US 12,448,515 B2
(45) Date of Patent: Oct. 21, 2025

(54) METHOD FOR PRODUCING POLYAMIDE RESIN COMPOSITION

(71) Applicant: TOYOBO CO., LTD., Osaka (JP)

(72) Inventors: Nobuhiro Yoshimura, Shiga (JP); Ryo Umeki, Shiga (JP)

(73) Assignee: TOYOBO MC CORPORATION, Osaka (JP)

( * ) Notice: Subject to any disclaimer, the term of this patent is extended or adjusted under 35 U.S.C. 154(b) by 573 days.

(21) Appl. No.: 17/793,542

(22) PCT Filed: Jan. 19, 2021

(86) PCT No.: PCT/JP2021/001652
§ 371 (c)(1),
(2) Date: Jul. 18, 2022

(87) PCT Pub. No.: WO2021/149674
PCT Pub. Date: Jul. 29, 2021

(65) Prior Publication Data
US 2023/0104768 A1   Apr. 6, 2023

(30) Foreign Application Priority Data
Jan. 24, 2020  (JP) ................. 2020-009963

(51) Int. Cl.
| | | |
|---|---|---|
| C08L 77/02 | (2006.01) | |
| C08G 69/46 | (2006.01) | |
| C08J 3/22 | (2006.01) | |
| C08K 3/04 | (2006.01) | |
| C08K 3/105 | (2018.01) | |
| C08K 7/10 | (2006.01) | |
| C08K 7/14 | (2006.01) | |

(52) U.S. Cl.
CPC .............. *C08L 77/02* (2013.01); *C08G 69/46* (2013.01); *C08J 3/226* (2013.01); *C08K 3/04* (2013.01); *C08K 3/105* (2018.01); *C08K 7/10* (2013.01); *C08K 7/14* (2013.01); *C08J 2377/00* (2013.01)

(58) Field of Classification Search
CPC ......... C08L 77/02; C08L 77/06; C08G 69/46; C08J 3/226; C08J 2377/00; C08J 2377/02; C08J 2425/12; C08J 2477/06; C08J 3/20; C08K 3/04; C08K 3/105; C08K 7/10; C08K 7/14; C08K 3/346; C08K 3/013; C08K 3/34; C08K 7/00
See application file for complete search history.

(56) References Cited

U.S. PATENT DOCUMENTS

| | | |
|---|---|---|
| 5,371,132 A | 12/1994 | Ebara et al. |
| 5,412,013 A | 5/1995 | Watanabe et al. |
| 6,534,583 B1 | 3/2003 | Tamura et al. |
| 2003/0125440 A1 | 7/2003 | Tamura et al. |
| 2003/0125481 A1 | 7/2003 | Tamura et al. |
| 2011/0263777 A1 | 10/2011 | Nakagawa |
| 2017/0267861 A1* | 9/2017 | I .............................. C08K 7/14 |
| 2018/0371185 A1* | 12/2018 | Tanaka ..................... C08K 3/04 |
| 2021/0101347 A1 | 4/2021 | Nishino et al. |
| 2022/0081563 A1 | 3/2022 | Yoshimura et al. |
| 2022/0289972 A1 | 9/2022 | Yoshimura et al. |

FOREIGN PATENT DOCUMENTS

| | | |
|---|---|---|
| CN | 108291086 | 7/2018 |
| EP | 0 337 443 | 10/1989 |
| EP | 3 889 213 | 10/2021 |
| JP | 1-263151 | 10/1989 |
| JP | 2-140265 | 5/1990 |
| JP | 3-9952 | 1/1991 |
| JP | 3-269056 | 11/1991 |
| JP | 4-202358 | 7/1992 |
| JP | 6-145345 | 5/1994 |
| JP | 2000-154316 | 6/2000 |
| JP | 2000154316 A * | 6/2000 |
| JP | 2001-98149 | 4/2001 |
| JP | 2002-69295 | 3/2002 |
| JP | 2002-97363 | 4/2002 |
| JP | 2004-315606 | 11/2004 |
| JP | 2005-239800 | 9/2005 |

(Continued)

OTHER PUBLICATIONS

Toshio, JP2000154316-MT (Year: 2000).*

(Continued)

*Primary Examiner* — Robert S Jones, Jr.
*Assistant Examiner* — Zhen Liu
(74) *Attorney, Agent, or Firm* — Wenderoth, Lind & Ponack, L.L.P.

(57) ABSTRACT

A method for producing a polyamide resin composition containing a crystalline polyamide resin (A) containing a polycaproamide resin as a main component, a semi-aromatic amorphous polyamide resin (B), an inorganic reinforcing material (C), a master batch of carbon black (D), and a copper compound (E); a dispersion liquid of the copper compound (E) has a concentration of 0.04% by mass to 1.0% by mass; and the crystalline polyamide resin (A) containing a polycaproamide resin as a main component, the semi-aromatic amorphous polyamide resin (B), the master batch of carbon black (D), and the dispersion liquid of the copper compound (E) are mixed in advance, followed by charging the mixture is into a hopper part of an extruder, and charging the inorganic reinforcing material (C) into the extruder by a side feed method.

2 Claims, No Drawings

(56) References Cited

FOREIGN PATENT DOCUMENTS

| | | |
|---|---|---|
| JP | 2010-13571 | 1/2010 |
| JP | 2011-057977 | 3/2011 |
| WO | 2010/087192 | 8/2010 |
| WO | 2017/094696 | 6/2017 |

OTHER PUBLICATIONS

International Search Report issued Mar. 30, 2021 in International (PCT) Application No. PCT/JP2021/001652.
Office Action issued Oct. 19, 2023 in corresponding Chinese Patent Application No. 202180009814.X with English translation.
Office Action issued Sep. 24, 2024 in Indian Patent Application No. 202247046998.
Office Action issued Feb. 28, 2024, in the corresponding Korean Patent Application No. 10-2022-7025283, with English translation.
Office Action issued Apr. 20, 2023 in corresponding Chinese Patent Application No. 202180009814.X, with English translation.
International Search Report (ISR) issued Feb. 10, 2020 in International (PCT) Application No. PCT/JP2019/045924.
Extended European Search Report issued Jul. 7, 2022 in European Patent Application No. 19889910.6.
Office Action issued Jun. 29, 2022 in Chinese Patent Application No. 201980076314.0, with English language translation.
Office Action issued Dec. 2, 2022 in Taiwanese Patent Application No. 108142870, with English-language translation.
International Search Report (ISR) issued Apr. 14, 2020 in International (PCT) Application No. PCT/JP2020/001857.
Extended European Search Report issued Sep. 23, 2022 in European Patent Application No. 20749218.2.
Extended European Search Report issued Jan. 18, 2024, in the corresponding European Patent Application No. 21744526.1.
Office Action issued Jan. 31, 2024, in the corresponding Taiwanese Patent Application No. 110102036, with English translation.
International Preliminary Report on Patentability issued Jul. 26, 2022 in International (PCT) Application No. PCT/JP2021/001652.
Notice of Allowance issued Mar. 7, 2024 in U.S. Appl. No. 17/421,203.
Office Action issued Feb. 19, 2025 in European Application No. 19 889 910.6.

\* cited by examiner

METHOD FOR PRODUCING POLYAMIDE RESIN COMPOSITION

TECHNICAL FIELD

The present invention relates to a polyamide resin composition containing a polycaproamide resin, a semi-aromatic amorphous polyamide resin, an inorganic reinforcing material, carbon black, and a copper compound as main components. Specifically, the polyamide resin composition of the present invention relates to a method for producing a polyamide resin composition which has excellent rigidity and strength, provides an excellent molded article appearance (specular glossiness of the surface, and surface uniformity of the embossed surface), and has also excellent weather resistance. The polyamide resin composition is particularly suitable for automobile exterior parts and door mirror parts.

BACKGROUND ART

In general, polyamide resins have excellent mechanical characteristics, heat resistance, impact resistance, and chemical resistance, and are widely used for automobile parts, electrical parts, electronic parts, and household goods and the like. In particular, it is known that a polyamide resin to which an inorganic reinforcing material represented by glass fiber is added has significantly improved rigidity, strength, and heat resistance, and has rigidity particularly improved in proportion to the addition amount of the inorganic reinforcing material.

However, if a large amount of 50 to 70% by mass of a reinforcing material such as glass fiber is added to the polyamide resin for the purpose of improving rigidity and strength, a molded article appearance (specular glossiness of a surface, and surface uniformity of an embossed surface and the like) is extremely deteriorated, and the commercial value of a molded article is significantly impaired. Therefore, as a method for improving the molded article appearance, it has been proposed to add an amorphous resin to a crystalline polyamide resin (Patent Documents 1 to 4). However, by these methods, good specular glossiness of the surface, and good surface uniformity of the embossed surface cannot be obtained.

There has been known a method in which a semi-aromatic polyamide resin (MXD-6) is highly filled with nylon 66, glass fiber, or mica to increase strength and rigidity (for example, Patent Document 5). In this case, it is necessary to raise a mold temperature during molding to a high temperature of 135° C., and a good molded article appearance may not be obtained even when the mold temperature is raised to a high temperature.

Therefore, a polyamide resin composition has been proposed, in which a molded article appearance is not deteriorated even when an inorganic reinforcing material such as glass fiber is added in a large amount of 50% mass or more (Patent Document 6). According to the resin composition disclosed in Patent Document 6, a substantially good molded article appearance can be obtained even when a mold temperature during molding is 100° C. or lower. However, there are a plurality of types of resins, and compositions of additives and pigments and the like also become complicated, which disadvantageously cause appearance defects to occur unexpectedly in molded articles and cause deteriorated weather resistance in some cases. In order to solve the problems, improvement has been required in order to provide a producing method maintaining stable quality.

PRIOR ART DOCUMENTS

Patent Document

Patent Document 1: JP-A-02-140265
Patent Document 2: JP-A-03-9952
Patent Document 3: JP-A-03-269056
Patent Document 4: JP-A-04-202358
Patent Document 5: JP-A-01-263151
Patent Document 6: JP-A-2000-154316

SUMMARY OF THE INVENTION

Problems to be Solved by the Invention

Therefore, the present invention provides a method for producing a polyamide resin composition which not only provides a molded article having a good appearance with a higher level when a mold temperature during molding is 100° C. or lower but also maintains stable quality of the polyamide resin composition having excellent weather resistance of the appearance of the surface of the molded article.

Means for Solving the Problems

As a result of intensive studies to solve the above problems, the present inventors have found that a method for producing a polyamide resin composition capable of stably providing a molded article having excellent weather resistance and a highly excellent appearance (uniformity of an embossed surface) of the molded article can be provided by reviewing the polyamide resin composition described in Patent Document 6 in detail, blending carbon black and a copper compound in specific amounts, and particularly using the copper compound as a dispersion liquid having a specific concentration, and have completed the present invention.

That is, the present invention is as follows.

[1] A method for producing a polyamide resin composition containing a crystalline polyamide resin (A) containing a polycaproamide resin as a main component, a semi-aromatic amorphous polyamide resin (B), an inorganic reinforcing material (C), a master batch of carbon black (D), and a copper compound (E),
wherein:
the polyamide resin composition contains glass fiber (C-1), needle-shaped wollastonite (C-2), and a plate-shaped crystal inorganic reinforcing material (C-3) as the inorganic reinforcing material (C);
a melt mass flow rate (MFR) of the polyamide resin composition at a moisture content of 0.05% or less is 4.0 g/10 min or more and less than 13.0 g/10 min;
a temperature-lowering crystallization temperature (TC2) of the polyamide resin composition, the temperature-lowering crystallization temperature (TC2) being measured with a differential scanning calorimeter (DSC) is 180° C. or higher and 185° C. or lower;
a mass ratio of (A) to (B) satisfies $0.5<(B)/(A)\leq 0.8$;
when the total of (A), (B), (C), and (D) is 100 parts by mass, the content of (E) is 0.001 to 0.1 parts by mass;
the content of each of the components satisfies the following formulae:
30 parts by mass$\leq$(A)+(B)+(D)$\leq$60 parts by mass;

13 parts by mass≤(B)≤23 parts by mass;
1 part by mass≤(D)≤5 parts by mass;
20 parts by mass≤(C-1)≤40 parts by mass;
8 parts by mass≤(C-2)≤25 parts by mass;
8 parts by mass≤(C-3)≤25 parts by mass; and
40 parts by mass≤(C-1)+(C-2)+(C-3)≤70 parts by mass;
a dispersion liquid of the copper compound (E) has a concentration of 0.04% by mass to 1.0% by mass; and the crystalline polyamide resin (A) containing a polycaproamide resin as a main component, the semi-aromatic amorphous polyamide resin (B), the master batch of carbon black (D), and the dispersion liquid of the copper compound (E) are mixed in advance, followed by charging the mixture is into a hopper part of an extruder, and charging the inorganic reinforcing material (C) into the extruder by a side feed method.

[2] The method for producing a polyamide resin composition according to [1], wherein the dispersion liquid of the copper compound (E) is an aqueous solution of the copper compound (E).

Effect of the Invention

A method for producing a polyamide resin composition of the present invention not only provides a molded article having a good appearance with a higher level when a mold temperature during molding is 100° C. or lower but also can stably produce a molded article having an excellent weather resistance of the appearance such as the embossed surface of the obtained molded article. Furthermore, the method has also excellent operability.

MODE FOR CARRYING OUT THE INVENTION

Hereinafter, the present invention will be specifically described. First, components used in the present invention will be described.

In the present invention, as for the crystallinity/non-crystallinity of a polyamide resin, when the polyamide resin is subjected to DSC measurement at a temperature rising rate of 20° C./min in accordance with JIS K 7121: 2012, a polyamide resin showing a clear melting point peak is defined as crystallinity, and a polyamide resin not showing a clear melting point peak is defined as non-crystallinity.

Unless otherwise specified, the content (blending amount) of each component in the polyamide resin composition of the present invention is represented by an amount based on 100 parts by mass of the total of a crystalline polyamide resin (A) containing a polycaproamide resin as a main component, a semi-aromatic amorphous polyamide resin (B), an inorganic reinforcing material (C), and a master batch of carbon black (D).

The component (A) in the present invention is a crystalline polyamide resin containing a polycaproamide resin as a main component. The polycaproamide resin is obtained by polymerization of ε-caprolactam, usually referred to as nylon 6. The relative viscosity (96% sulfuric acid method) of the polycaproamide resin in the present invention is preferably within the range of 1.7 to 2.2. Particularly preferably, the relative viscosity is within the range of 1.9 to 2.1. When the relative viscosity is within this range, the toughness and fluidity of the resin (the fluidity provides a desired molded article appearance) can be satisfied. However, it is more realistic to regulate the melt mass flow rate of the polyamide resin composition than to regulate the relative viscosity of the polycaproamide resin.

The content of the polycaproamide resin in the component (A) is preferably 70% by mass or more, more preferably 80% by mass or more, and still more preferably 90% by mass or more. The content of the polycaproamide resin may be 100% by mass. In the component (A), the crystalline polyamide resin that may be contained as a component other than the polycaproamide resin is not particularly limited, and examples thereof include polytetramethylene adipamide (polyamide 46), polyhexamethylene adipamide (polyamide 66), polyundecamethylene adipamide (polyamide 116), polymethaxylylene adipamide (polyamide MXD6), polyparaxylylene adipamide (polyamide PXD6), polytetramethylene sebacamide (polyamide 410), polyhexamethylene sebacamide (polyamide 610), polydecamethylene adipamide (polyamide 106), polydecamethylene sebacamide (polyamide 1010), polyhexamethylene dodecamide (polyamide 612), polydecamethylene dodecamide (polyamide 1012), polyhexamethylene isophthalamide (polyamide 6I), polytetramethylene terephthalamide (polyamide 4T), polypentamethylene terephthalamide (polyamide 5T), poly-2-methylpentamethylene terephthalamide (polyamide M-5T), polyhexamethylene terephthalamide (polyamide 6T), polyhexamethylene hexahydroterephthalamide (polyamide 6T(H)), polynonamethylene terephthalamide (polyamide 9T), polydecamethylene terephthalamide (polyamide 10T), polyundecamethylene terephthalamide (polyamide 11T), polydodecamethylene terephthalamide (polyamide 12T), polylauryl lactam (polyamide 12), poly-11-aminoundecanoic acid (polyamide 11), and copolymers of these constituent units.

The component (B) in the present invention is a semi-aromatic amorphous polyamide resin containing an aromatic component in either a diamine component or a dicarboxylic acid component. Examples of the dicarboxylic acid include terephthalic acid, isophthalic acid, adipic acid, and sebacic acid, and examples of the diamine include tetramethylenediamine, hexamethylenediamine, meta-xylylenediamine, para-xylylenediamine, undecamethylenediamine, dodecamethylenediamine, 2-methylpentamethylenediamine, trimethylhexamethylenediamine, aminoethylpiperazine, and bisaminomethylcyclohexane. Among them, polyamide 6T/6I containing terephthalic acid, isophthalic acid, and hexamethylenediamine as raw materials is preferable.

The relative viscosity (96% sulfuric acid method) of the semi-aromatic amorphous polyamide resin is not particularly limited, but is preferably within the range of 1.8 to 2.4.

The total content of the component (A), the component (B), and the master batch of carbon black (D) to be described later is 30 to 60 parts by mass, and preferably 35 to 55 parts by mass. The content of the component (B) is 13 to 23 parts by mass, and preferably 13 to 22 parts by mass. When the content of the component (B) is less than 13 parts by mass, a good molded article appearance with a higher level cannot be obtained. Conversely, when the content of the component (B) is more than 23 parts by mass, the crystallization solidification of the molded article is deteriorated, which causes mold release failure during molding or reduced hot rigidity. The content of the component (A) is not particularly limited as long as it is determined in consideration of the contents of the component (B) and the component (D), but is preferably 20 to 34 parts by mass, and more preferably 21 to 32 parts by mass.

In the present invention, the mass ratio of the component (A) and the component (B) needs to satisfy the following formula.

$$0.5<(B)/(A)\le 0.8$$

In the present invention, when (B)/(A) is within this range, a molded article having a good appearance with a higher level is obtained, and (B)/(A) is preferably 0.52 or more and 0.75 or less, and more preferably 0.55 or more and 0.75 or less.

The component (C) in the present invention is an inorganic reinforcing material, and includes glass fiber (C-1), needle-shaped wollastonite (C-2), and a plate-shaped crystal inorganic reinforcing material (C-3). Examples of the plate-shaped crystal inorganic reinforcing material (C-3) include mica, talc, and unfired clay. Among them, mica and talc are preferable, and mica is more preferable. As the component (C), a fibrous inorganic reinforcing material such as whisker, carbon fiber, or ceramic fiber, or a powdery inorganic reinforcing material such as silica, alumina, kaolin, quartz, powdery glass (milled fiber), or graphite may be contained as long as the effect of the present invention is not impaired. These inorganic reinforcing materials to be used may be subjected to surface treatment such as aminosilane treatment.

As the glass fiber (C-1), general glass fiber having an average cross-sectional diameter of about 4 to 20 μm and a cut length of about 3 to 6 mm can be used. The average fiber length of the glass fiber in the molded article is reduced to about 150 to 300 μm in a processing step (compounding step/molding step). The content of the glass fiber (C-1) is 20 to 40 parts by mass, and preferably 25 to 35 parts by mass. If the content is less than 20 parts by mass, the strength and rigidity of the molded article are low. Conversely, if the content exceeds 40 parts by mass, it is difficult to obtain a good molded article appearance, which is not preferable.

The needle-shaped wollastonite (C-2) is wollastonite having an average cross-sectional diameter of about 3 to 40 μm and an average fiber length of about 20 to 180 μm. The content of the needle-shaped wollastonite (C-2) is 8 to 25 parts by mass, preferably 10 to 25 parts by mass, and more preferably 13 to 20 parts by mass. If the content is less than 8 parts by mass, the strength and rigidity of the molded article are low. Conversely, if the content exceeds 25 parts by mass, it is difficult to obtain a good molded article appearance, which is not preferable.

Examples of the plate-shaped. crystal inorganic reinforcing material (C-3) include talc, mica, and unfired clay, and the shape thereof is a form like a fish scale. The content thereof is 8 to 25 parts by mass, preferably 10 to 25 parts by mass, and more preferably 13 to 20 parts by mass. If the content is less than 8 parts by mass, the strength and rigidity of the molded article are low. Conversely, if the content exceeds 25 parts by mass, it is difficult to obtain a good molded article appearance, which is not preferable. Among the plate-shaped crystal inorganic reinforcing materials (C-3), mica is particularly excellent in terms of strength and rigidity.

The content of the inorganic reinforcing material as the component (C) is 40 to 70 parts by mass, preferably 45 to 70 parts by mass, and more preferably 55 to 65 parts by mass. When the content is less than 40 parts by mass, the strength and rigidity of the molded article are low. Conversely, when the content is more than 70 parts by mass, a good molded article appearance cannot be obtained, and the strength is also deteriorated. When 20 to 40 parts by mass of the component (C-1), 8 to 25 parts by mass of the component (C-2), and 8 to 25 parts by mass of the component (C-3) are contained as the component (C), the strength and rigidity of the molded article are excellent, and the surface appearance (specular glossiness of the surface, and surface uniformity of the embossed surface) of the molded article is excellent.

All the components (C) exhibit a reinforcing effect in the polyamide resin composition, and among them, the glass fiber (C-1) has the highest reinforcing effect, but the warp deformation of the molded article is also large. The needle-shaped wollastonite (C-2) and the plate-shaped crystal inorganic reinforcing material (C-3) have no reinforcing effect as much as that of glass fibers, but have an aspect ratio smaller than that of glass fibers, and thus have an advantage that warpage deformation is reduced. The needle-shaped wollastonite can also contribute to the prevention of sink marks after molding, and by appropriately combining these components, a resin composition that does not cause large deformation after molding even when a reinforcing material is blended at a high concentration can be produced.

In general, a reinforced polyamide resin composition to which glass fibers and wollastonite and the like are blended at a high concentration has poor weather resistance, whereby the reinforcing material is exposed. However, weather resistance can be controlled by combining a carbon black master batch with a copper compound as described later, whereby the exposure of the reinforcing material can be prevented.

The component (D) in the present invention is a carbon black master batch, and it is preferable that LD-PE (low density polyethylene) or AS resin (acrylonitrile-styrene copolymer) which is compatible with a polyamide resin is used as a base resin, and 30 to 60% by mass of carbon black is contained in the master batch. By using these master batches, not only the dispersibility of carbon black is excellent and the effect of excellent working environmental properties is obtained, but also the effect of suppressing the floating and exposure of glass fibers and other inorganic reinforcing materials is high, and the effect of improving the weather resistance of the molded article appearance is exhibited. The content of the carbon black master batch is 1 to 5 parts by mass, and preferably 2 to 4 parts by mass. The content of the carbon black is preferably within the range of 0.5 to 3.0 parts by mass, and more preferably within the range of 1 to 2 parts by mass. When the content of the carbon black is more than 3.0 parts by mass, mechanical physical properties may be deteriorated.

The component (E) in the present invention is a copper compound, and is not particularly limited as long as it is a compound containing copper, and. examples thereof include copper halide (copper iodide, cuprous bromide, cupric bromide, cuprous chloride, and the like), copper acetate, copper propionate, copper benzoate, copper adipate, copper terephthalate, copper isophthalate, copper salicylate, copper nicotinate and copper stearate, and copper complex salts in which a chelating agent such as ethylenediamine or ethylenediaminetetraacetic acid is coordinated to copper. One type of these may be used alone, or two or more thereof may be used in combination.

Among the copper compounds listed above, the copper compound is preferably copper halide, more preferably one or more selected from the group consisting of copper iodide, cuprous bromide, cupric bromide, and cuprous chloride, still more preferably one or more selected from the group consisting of copper iodide, cuprous bromide, and cupric bromide, and particularly preferably cupric bromide. By using the copper compound, a polyamide resin composition having excellent weather resistance can be obtained.

The content of the component (B) is 0.001 to 0.1 parts by mass, and preferably 0.01 to 0.05 parts by mass. If 0.1 parts by mass or more of the component (E) is added, the risks of metal corrosiveness and discoloration increase.

When the copper compound (E) is uniformly mixed in the resin composition, the copper compound (E) needs to be used as a dispersion liquid having a concentration of 0.04% by mass to 1.0% by mass. When the copper compound is used as the dispersion liquid having a concentration of 1.0% by mass or less, the copper compound can be uniformly kneaded in the resin composition. The concentration is preferably 0.05% by mass to 0.7% by mass. When the concentration is less than 0.04% by mass, a dispersion medium (for example, water) increases in order to add a necessary amount of the copper compound (E), which may cause problems in terms of operability, such as an increase in the amount of vapor generated from the dispersion medium during kneading, and adhesion of a raw material component to a hopper or the like of a kneader stand due to the influence of the dispersion medium. The dispersion liquid of the copper compound (E) may be a solution in which the copper compound (E) is completely dissolved. The dispersion liquid of the copper compound (E) is preferably an aqueous solution of the copper compound (E).

Furthermore, the polyamide resin composition of the present invention is required to have a melt mass flow rate of 4.0 g/10 min or more and less than 13.0 g/10 min at a moisture content of 0.05% (0.05% by mass) or less, and a temperature-lowering crystallization temperature (TC2) measured with a differential scanning calorimeter (DSC) of 180° C.≤(TC2)≤185° C.

The melt mass flow rate (MFR) is a value measured at 275° C. under a load of 2160 g in accordance with JIS K 7210-1: 2014. The temperature-lowering crystallization temperature (TC2) is a peak temperature obtained in measurement in which a differential scanning calorimeter (DSC) is used to raise the temperature to 300° C. at a temperature rising rate of 20° C./min under a nitrogen stream, retain the temperature for 5 min at the temperature, and lower the temperature to 100° C. at a rate of 10° C./min.

When the melt mass flow rate is less than 4.0 g/10 min, a good molded article appearance is not obtained. In order to obtain a polyamide resin composition having a melt mass flow rate of 4.0 g/10 min or more, if a crystalline polyamide resin having a relative viscosity of 2.3 or more, which is usually used, is used, the range of the melt mass flow rate may not be reached (less than 4.0 g/10 min). Therefore, it is preferable to use a crystalline polyamide resin having an ultra-low viscosity (relative viscosity: 1.7 to 2.2) or to adopt a formulation in which a molecular chain-cleaving agent for the polyamide resin is added during compounding processing, or the like. As the molecular chain-cleaving agent (also referred to as viscosity-decreasing agent) for the polyamide resin, aliphatic dicarboxylic acids and aromatic dicarboxylic acids and the like are effective. Specific examples thereof include, but not particularly limited to, oxalic acid, malonic acid, succinic acid, adipic acid, azelaic acid, sebacic acid, phthalic acid, and terephthalic acid. When the molecular chain-cleaving agent is added (contained), and the addition amount thereof is around 0.1 to 3 parts by mass with respect to 100 parts by mass of the total of the components (A), (B), (C), and (D) of the present invention, the melt mass flow rate of the composition of the present invention is 4.0 g/10 min or more. However, the effect of the molecular chain-cleaving agent varies depending on compounding processing conditions, and as a matter of course, as a processing temperature is higher, or as a polymer retention time at the time of compounding is longer, the effect is more excellent. Usually, a compounding processing temperature is within the range of 240 to 300° C., and a polymer retention time at the time of compounding is generally within 15 to 60 seconds.

When the melt viscosity of the resin is low, drawdown or difficult weighing may occur at the time of injection molding. When the melt mass flow rate is 13.0 g/10 min or more, a molding condition width at the time of injection molding may be narrowed.

Furthermore, when the temperature-lowering crystallization temperature (TC2) does not satisfy 180° C.≤(TC2) ≤185° C., a good molded article appearance with a higher level is not obtained due to the crystallization rate of the polyamide resin composition.

To the polyamide resin composition of the present invention, a heat resistance stabilizer, an antioxidant, an ultraviolet absorber, a light stabilizer, a plasticizer, a lubricant, a crystal nucleating agent, a release agent, an anti-static agent, a flame retardant, a pigment, a dye, or another type of polymer or the like can also be added as necessary. In the polyamide resin composition of the present invention, the total of the components (A), (B), (C), (D), and (E) preferably accounts for 90% by mass or more, and more preferably 95% by mass or more.

The method for producing the polyamide resin composition of the present invention requires a single screw or twin screw extruder, a kneading machine, and a kneader and the like, but from the viewpoint of productivity, a twin screw extruder is preferable. Screw arrangement is not particularly limited, but a kneading zone is preferably provided in order to more uniformly disperse components. As a specific method, a crystalline polyamide resin (A) containing a polycaproamide resin as a main component, a semi-aromatic amorphous polyamide resin (B), a master batch of carbon black (D), a dispersion liquid of a copper compound (E), and other optional components are preblended with a blender, and the preblended product is charged from a hopper into a uniaxial or biaxial extruder. Then, in a state where at least a part of the components (A), (B), and (E) are melted, glass fiber (C-1), needle-shaped wollastonite (C-2), and a plate-shaped crystal inorganic reinforcing material (C-3) as an inorganic reinforcing material (C) are charged into the molten mixture by a side feed method, and melt-kneaded. Then, the melt-kneaded product is discharged into a strand shape, cooled, and cut.

The liquid component (dispersion medium) containing the component (E) can suppress gradual separation and segregation of the component (A), the component (B), and the component (D) with a very weak adhesive force. Therefore, as the degree of difference in the shape, apparent specific gravity, and friction coefficient and the like of the pellets of each component is larger, the effect of the present invention is exhibited.

The polyamide resin composition produced by the present invention has the following excellent weather resistance because it is produced with the composition as described above. That is, a color difference ΔE after a weather resistance test (in accordance with JIS K-7350-2) using a xenon weather meter is 4.5 or less, more preferably 4.0 or less, still more preferably 3.5 or less, and particularly preferably 2.5 or less. Details of the weather resistance test depend on a procedure described in Examples described later. When the color difference ΔE is equal to or less than the above value, the polyamide resin composition can withstand outdoor use exposed to rainfall.

EXAMPLES

Hereinafter, the present invention will be described in more detail with reference to Examples, but the present invention is not limited to these Examples at all.

Characteristics and physical property values shown in the following Examples and Comparative Examples were measured by the following test methods.

1) Melt mass flow rate (MFR): Resin composition pellets were dried to a moisture content of 0.05% or less by a hot-air dryer, and a melt mass flow rate was measured at 275° C. under a load of 2160 g in accordance with JIS K 7210-1: 2014.

2) Temperature-lowering crystallization temperature (TC2): A DSC measuring device (EXSTAR6000 manufactured by Seiko Instruments Inc.) was used. The temperature was raised to 300° C. under a nitrogen flow at a temperature rising rate of 20° C./min, and maintained for 5 min at the temperature. Then, a peak top of an exothermic peak when the temperature was decreased to 100° C. at a rate of 10° C./min was defined as TC2. A DSC measurement sample was cut out from the vicinity of the central portion of a flat plate of 100 mm×100 mm×3 mm in the following evaluation.

3) Flexural strength: Flexural strength was measured in accordance with JIS K 7171: 2016.

4) Flexural modulus: Flexural modulus was measured in accordance with JIS K 7171:2016.

5) Specular glossiness: Using a mirror finished mold having a size of 100 mm×100 mm×3 mm (thickness), a molded article was produced at a resin temperature of 280° C. and a mold temperature of 80° C. Then, glossiness at an incident angle of 60 degrees was measured in accordance with JIS Z-8714 (a higher numerical value indicates better glossiness).

The measurement results for the glossiness were denoted as "glossiness of 95 or more: good, glossiness of less than 95 and 90 or more: average, and glossiness of less than 90: poor".

6) Color difference ΔE after weather resistance test: An embossed flat plate (100 mm×100 mm×2 mm) molded by an injection molding machine (IS80 manufactured by Toshiba Machinery) at a cylinder temperature of 280° C. and a mold temperature of 90° C. was subjected to a weather resistance test in accordance with JIS K-7350-2 using a xenon weatherometer (XL75 manufactured by Suga Shikenki KK) (black panel temperature: 63±2° C., relative humidity: 50±5%, irradiation method: rainfall for 18 min during 120 min (being sprinkled with water), irradiation time: 1250 hours, irradiation degree: 60 W/m²·S with 300 to 400 nm wavelength, optical filters: quartz (inside) and borosilicate #275 (outside). For the embossed flat plate before and after the weather resistance test, values of "L", "a" and "b" were measured using a spectrophotometer TC-1500 SX manufactured by Tokyo Denshoku, and the color difference ΔE was calculated.

7) Surface appearance of molded article after weather resistance test (presence or absence of exposure of reinforcing material: For the embossed flat plate after the weather resistance test as described in the above 6), determination was visually made in accordance with the following indices:

Good: No exposure of the reinforcing material was observed. Poor: The exposure of the reinforcing material was observed.

8) Surface embossed state of molded article after weather resistance test: For the embossed flat plate after the weather resistance test as described in the above 6), determination was visually made in accordance with the following indices:

Good: An embossed pattern was clearly visible. Poor: No embossed pattern was confirmed.

9) Operability: In a twin screw extruder, the states of the inside of a hopper during production, vent port, and strand were confirmed.

[Criteria for Determination]

Good: no adhesion of a resin component in the hopper, no ejection of a large amount of gas from the vent port, and no breakage of the strand during production Poor: adhesion of a resin component in the hopper, ejection of a large amount of gas from the vent port, or breakage of the strand during production 10) Evaluation of production stability: The color difference ΔE in the evaluation of the weather resistance test in the above 6) was measured using the resin composition immediately after the start of melt-kneading, the resin composition after 30 min from the start of melt-kneading, and the resin composition after 1 hour from the start of melt-kneading. Determination was made in accordance with the following criteria.

[Criteria for Determination]

Good: (maximum ΔE)−(minimum ΔE) is less than 0.5.

Average: (maximum ΔE)−(minimum ΔE) is 0.5 or more and less than 1.0.

Poor: (maximum ΔE)−(minimum ΔE) is 1.0 or more.

Raw materials used in Examples and Comparative Examples are as follows.

(A) Crystalline polyamide resin: Nylon 6, M2000, manufactured by MEIDA, relative viscosity: 2.0

(B) Semi-aromatic amorphous polyamide resin: hexamethylene terephthalamide/hexamethylene isophthalamide (6T/6I resin), G21, manufactured by EMS, relative viscosity: 2.1

(C-1) Glass fiber: ECS03T-275H, manufactured by Nippon Electric Glass Co., Ltd., fiber diameter: 10 μm, cut length: 3.0 mm (C-2) Needle-shaped wollastonite: NYGLOS-8, manufactured by NYCO, average fiber diameter: 8 μm, average fiber length: 136 μm (C-3) Plate-shaped crystal inorganic reinforcing material: Mica, S-325, manufactured by Repco Inc., average particle diameter: 18 μm, average aspect ratio: 20

(D) Master batch of carbon black: ABF-T-9801, manufactured by Resino Color Industry Co., Ltd., base resin: AS resin, containing 45% by mass of carbon black (E) Copper compound: cupric bromide Examples 1 to 4 and Comparative Examples 1 to 6

When an aqueous solution of a copper compound was charged, an addition method A was described in Table 1, and when the copper compound was directly charged as it was, an addition method B was described in Table 1. In the addition method A, an aqueous solution of cupric bromide as the copper compound was used. The concentration of the aqueous solution of the copper compound was adjusted to the concentration described in Table 1.

Raw materials other than the inorganic reinforcing material were mixed in advance so as to have compositions shown in Table 1, and the mixture was charged from a hopper part of a twin screw extruder. Each reinforcing material was charged from a side feeder of the twin screw extruder. Compounding was performed at a cylinder temperature of the twin screw extruder of 280° C. and a screw rotation speed of 180 rpm to produce pellets. The obtained pellets were dried with a hot air dryer until the moisture content was 0.05% or less, and then various characteristics were evaluated. The evaluation results are shown in Table 1.

TABLE 1

|  |  | unit | Example 1 | Example 2 | Example 3 | Example 4 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|
| composition | (A) Nylon 6 | parts by mass | 23 | 31 | 30 | 23 | 26 | 20 | 25 | 20 | 23 | 23 |
|  | (B) 6T/6I resin | parts by mass | 14 | 17 | 22 | 14 | 12 | 18 | 12 | 17 | 14 | 14 |
|  | (C-1) Glass fiber | parts by mass | 30 | 25 | 25 | 30 | 30 | 30 | 30 | 30 | 30 | 30 |
|  | (C-2) Needle-shaped wollastonite | parts by mass | 15 | 12 | 10 | 15 | 16 | 16 | 15 | 15 | 15 | 15 |
|  | (C-3) Mica | parts by mass | 15 | 12 | 10 | 15 | 16 | 16 | 15 | 15 | 15 | 15 |
|  | (D) Master batch of carbon black | parts by mass (as MB) | 3 | 3 | 3 | 3 | 0 | 0 | 3 | 3 | 3 | 3 |
|  |  | parts by mass (only carbon black) | 1.35 | 1.35 | 1.35 | 1.35 | 0 | 0 | 1.35 | 1.35 | 1.35 | 1.35 |
|  | (E) cupric bromide | parts by mass | 0.02 | 0.04 | 0.02 | 0.02 | 0.02 | 0.02 | 0.02 | 0.02 | 0.02 | 0.02 |
|  | (B)/(A) | — | 0.61 | 0.55 | 0.73 | 0.61 | 0.46 | 0.90 | 0.48 | 0.85 | 0.61 | 0.61 |
|  | (A) + (B) + (D) | parts by mass | 40 | 51 | 55 | 40 | 38 | 38 | 40 | 40 | 40 | 40 |
|  | (C-1) + (C-2) + (C-3) | parts by mass | 60 | 49 | 45 | 60 | 62 | 62 | 60 | 60 | 60 | 60 |
| addition of a copper compound | addition method |  | A | A | A | A | B | B | A | B | A | A |
|  | concentration (mass %) |  | 0.50 | 0.50 | 0.09 | 0.05 | — | — | 0.50 | — | 2.00 | 0.02 |
| Evaluation Results | MFR | g/10 min | 9.0 | 10.8 | 9.0 | 9.0 | 11.9 | 3.8 | 11.4 | 3.8 | 9.0 | 9.0 |
|  | crystallization temperature | ° C. | 182 | 184 | 180 | 182 | 187 | 170 | 189 | 172 | 182 | 182 |
|  | Flexural strength | MPa | 250 | 292 | 243 | 250 | 240 | 255 | 240 | 255 | 250 | 250 |
|  | Flexural modulus | GPa | 18.5 | 20.0 | 16.7 | 18.5 | 18.0 | 18.7 | 18.0 | 18.7 | 18.5 | 18.5 |
|  | Specular glossiness | — | 98 (good) | 98 (good) | 99 (good) | 98 (good) | 90 (average) | 80 (poor) | 90 (average) | 80 (poor) | 98 (good) | 98 (good) |
|  | Color difference ΔE after weather resistance test | — | 4.0 | 2.0 | 4.0 | 4.0 | 5.5 | 5.5 | 5.0 | 5.0 | 4.2 | 4.0 |
|  | presence or absence of exposure of reinforcing material after weather resistance test | — | good | good | good | good | poor | poor | good | good | good | good |
|  | embossed state after weather resistance test | — | good | good | good | good | poor | poor | poor | poor | good | good |
|  | Operability | — | good | good | good | good | good | good | good | good | qood | poor |
|  | production stability | — | good (0.2) | good (0.2) | qood (0.2) | good (0.2) | poor (1.2) | poor (1.2) | average (0.8) | poor (1.4) | poor (1.0) | good (0.4) |

From Table 1, test pieces of Examples 1 to 4 had a small color difference ΔE before and after the weather resistance test, a highly excellent surface appearance (uniformity of the embossed surface), weather resistance capable of maintaining an excellent surface appearance even after the weather resistance test, and excellent productivity. Meanwhile, in test pieces of Comparative Examples 1 and 2, the surface appearance (specular glossiness) was not satisfactory. The surface appearance could not be maintained after the weather resistance test, and the productivity was also poor. In a test piece of Comparative Example 3, the surface appearance (specular glossiness) was slightly poor. The surface appearance (uniformity of the embossed surface) could not be maintained after the weather resistance test, and the production stability was also slightly poor. In a test piece of Comparative Example 4, the surface appearance (specular glossiness) was not satisfactory. The surface appearance (uniformity of the embossed surface) could not be maintained after the weather resistance test, and the production stability was also poor. In Comparative Example 5, the aqueous solution concentration was 0.04% by mass or more, whereby the operability had no problem, but the aqueous solution concentration was high, whereby the dispersion in the raw material did not proceed, which caused a problem in production stability. In Comparative Example 6, the aqueous solution concentration was less than 0.04% by mass. The resin adhered and remained in the hopper, and a large amount of gas was generated from the vent port.

INDUSTRIAL APPLICABILITY

The polyamide resin composition of the present invention has an excellent balance between a good appearance and high rigidity, and can be suitably used for engineering plastic applications such as automobile applications and electrical and electronic component applications.

The invention claimed is:

1. A method for producing a polyamide resin composition containing a crystalline polyamide resin (A) containing a polycaproamide resin as a main component, a semi-aromatic amorphous polyamide resin (B), an inorganic reinforcing material (C), a master batch of carbon black (D), and a copper compound (E),
wherein:
the polyamide resin composition contains glass fiber (C-1), needle-shaped wollastonite (C-2), and a plate-shaped crystal inorganic reinforcing material (C-3) as the inorganic reinforcing material (C);
a melt mass flow rate (MFR) of the polyamide resin composition at a moisture content of 0.05% or less is 4.0 g/10 min or more and less than 13.0 g/10 min;
a temperature-lowering crystallization temperature (TC2) of the polyamide resin composition, the temperature-lowering crystallization temperature (TC2) being measured with a differential scanning calorimeter (DSC) is 180° C. or higher and 185° C. or lower;
a mass ratio of (A) to (B) satisfies $0.5<(B)/(A) \leq 0.8$;
when the total of (A), (B), (C), and (D) is 100 parts by mass, the content of (E) is 0.001 to 0.1 parts by mass;
the content of each of the components satisfies the following formulae:
30 parts by mass $\leq(A)+(B)+(D)\leq 60$ parts by mass;
13 parts by mass $\leq(B)\leq 23$ parts by mass;
1 part by mass $\leq(D)\leq 5$ parts by mass;
20 parts by mass $\leq(C-1)\leq 40$ parts by mass;
8 parts by mass $\leq(C-2)\leq 25$ parts by mass;
8 parts by mass $\leq(C-3)\leq 25$ parts by mass; and
40 parts by mass $\leq(C-1)+(C-2)+(C-3)\leq 70$ parts by mass;
a dispersion liquid of the copper compound (E) has a concentration of 0.04% by mass to 1.0% by mass; and
the crystalline polyamide resin (A) containing a polycaproamide resin as a main component, the semi-aromatic amorphous polyamide resin (B), the master batch of carbon black (D), and the dispersion liquid of the copper compound (E) are mixed in advance, followed by charging the mixture into a hopper part of an extruder, and charging the inorganic reinforcing material (C) into the extruder by a side feed method.

2. The method for producing a polyamide resin composition according to claim 1, wherein the dispersion liquid of the copper compound (E) is an aqueous solution of the copper compound (E).

* * * * *